United States Patent [19]
Anderson et al.

[11] Patent Number: 5,779,172
[45] Date of Patent: Jul. 14, 1998

[54] DRIVE FOR HANDLING MULTIPLE SIZE INFORMATION STORAGE MEDIA CARTRIDGES AND CARTRIDGES THEREFOR

[75] Inventors: James S. Anderson, Chanhassen; Sten R. Gerfast, Mendota Heights; Warren W. Opheim, Prior Lake; Robert W. Tapani, Oakdale; Hung T. Tran, Woodbury, all of Minn.

[73] Assignee: Imation Corp., Oakdale, Minn.

[21] Appl. No.: 716,749

[22] Filed: Sep. 23, 1996

Related U.S. Application Data

[63] Continuation of Ser. No. 243,504, May 16, 1994, Pat. No. 5,558,291.

[51] Int. Cl.⁶ .................................. G11B 23/087
[52] U.S. Cl. .................................. 242/336; 242/338.4
[58] Field of Search .................. 242/336, 338.4, 242/352.3, 352.4; 360/92, 94, 96.5

[56] References Cited

U.S. PATENT DOCUMENTS

| | | |
|---|---|---|
| 3,692,255 | 9/1972 | von Behren . |
| 4,008,490 | 2/1977 | Lemelson ............................ 242/336 |
| 4,074,876 | 2/1978 | Gourley . |
| 4,262,860 | 4/1981 | Hurtig et al. . |
| 4,498,112 | 2/1985 | Georgens et al. .............. 360/96.5 |
| 4,556,923 | 12/1985 | Olmsted ........................... 360/96.5 |
| 4,586,095 | 4/1986 | Olmsted ........................... 360/96.5 |
| 4,622,606 | 11/1986 | Rudi ................................. 360/96.5 |
| 4,673,995 | 6/1987 | Spiegelstein .................... 360/96.5 |
| 4,786,996 | 11/1988 | Ohtani et al. ......................... 360/94 |
| 4,803,575 | 2/1989 | Nishimura et al. .................. 360/94 |
| 4,807,067 | 2/1989 | Spiegelstein .................... 360/96.5 |
| 4,853,805 | 8/1989 | Baranski ............................... 360/94 |
| 5,016,127 | 5/1991 | Inoue et al. ........................... 360/94 |
| 5,109,308 | 4/1992 | Kukreja et al. ................... 360/96.5 |
| 5,121,271 | 6/1992 | Sakumoto et al. .................. 360/94 |
| 5,239,436 | 8/1993 | Aizawa et al. ..................... 360/132 |
| 5,240,200 | 8/1993 | Nishimura et al. . |
| 5,323,280 | 6/1994 | Rudi ................................. 360/96.5 |
| 5,440,435 | 8/1995 | Busengdal et al. ............... 360/96.6 |

FOREIGN PATENT DOCUMENTS

| | | |
|---|---|---|
| 0 391 465 | 10/1990 | European Pat. Off. . |
| 0 400 579 | 12/1990 | European Pat. Off. . |
| 2 185 960 | 8/1987 | United Kingdom . |
| WO 92/09989 | 6/1992 | WIPO . |

OTHER PUBLICATIONS

QIC Development Standard, QIC-139, Revision E (Dec. 9, 1993).

Primary Examiner—John P. Darling
Attorney, Agent, or Firm—Eric D. Levinson

[57] ABSTRACT

A drive can handle media cartridges of differing physical size provided the relative positioning of the drive/control mechanism and the media access opening for the cartridges can be held constant. Numerous possible structures and cartridges using this concept are disclosed.

9 Claims, 8 Drawing Sheets

DRIVE FOR HANDLING MULTIPLE SIZE INFORMATION STORAGE MEDIA CARTRIDGES AND CARTRIDGES THEREFOR

This is a continuation of application Ser. No. 08/243,504 filed May 16, 1994 now U.S. Pat. No. 5,558,291.

BACKGROUND OF THE INVENTION

1. Field of the Invention

The present invention relates to information storage media drives and cartridges therefor, and in particular to a computer media drive capable of handling a variety of media cartridges having physically different sizes, as well as cartridges for such a drive.

2. Description of the Related Art

Tape and disk cartridges and cassettes have been used for decades in the computer, audio and visual fields. The cartridges themselves have come in a large variety of sizes and types. However, during this entire period, any individual drive was designed to handle only one physical size media container. The drive might be able to handle different storage capacities within the cartridge, for example, due to varying length, thickness or composition of the media, but any given drive has only been able to handle one physical size cartridge.

There have been suggestions to overcome this drive limitation with alternative cartridge designs in which the part of the cartridge that has to fit into the drive matches the traditional physical cartridge dimensions, but then an extension is added to the back end of the cartridge to hold more media, for example, as shown in U.S. Pat. Nos. 4,262,860 (Hurtig et al.) and 5,239,436 (Aizawa et al.).

Unfortunately, the extension may stick out so far from the drive that it is unstable, or risks having a user use it as a shelf. The larger shape also can only be used with a drive-type that allows the back end of the cartridge to stick out of the drive during use, that is, it cannot be used with a "softloading" drive which pulls the entire cartridge into the drive for use. It also cannot be used with rotating media, such as diskettes, since for rotating media the sideways dimensions of the media carrier must also be expanded to hold more media, which prevents the carrier from fitting into the traditional drive.

Another concept has been to use adapters to allow drives to handle different tapes. For example, the CVHS videotape is physically smaller than a standard VHS videotape. This means it cannot be played in a standard VHS drive. An adapter therefore was developed. With this adapter, the CVHS tape is placed in the adapter, and the adapter is then placed in the VHS drive. The adapter positions the tape in the correct location for the standard VHS drive to use, and includes mechanical components to connect the drive mechanism of the standard VHS drive to the drive mechanism of the mini VHS cartridge.

More recently, electronic adapters have appeared on the market to connect the outputs of different types of drive components into a tape drive. For example, adapters are available to allow the output of a portable audio CD player to be fed into and read by a tape drive. This can be useful, for example, in an automobile, where it would be difficult to replace the tape drive with a CD player, but it is desirable to use the audio system to which the tape drive is connected to generate sound.

In these last two situations, an adapter has to be used which would fit in the standard tape drive. The drive itself could not accept a variety of physically different size cartridges.

One popular computer tape cartridge and a drive for that cartridge was originally disclosed in U.S. Pat. No. 3,692,255 (Von Behren) in 1972. An adaptation of the original Von Behren tape cartridge and drive for a 5.25 form factor drive has been very popular for some while. More recently, the physically smaller 3.5 form factor drive has become much more popular. (The terms 5.25 and 3.5 originally referred to the physical dimensions in inches of two different size diskettes. The drive bays in computers into which drives for these diskettes fit became standardized. When tape drives then were designed to fit into these same bays, the 3.5 and 5.25 designations carried over as names because the drive bays were commonly referred to by those terms. The numbers have no direct relationship to the physical size of the tape cartridges or the drives. They are just the common names for that size drive and the standard size tape cartridges which will fit into them.)

An example of such a prior art 3.5 form factor cartridge 20 (also referred to as a mini cartridge) is shown in FIGS. 1 and 2 in a schematically represented drive 40. The mini cartridge 20 includes two hubs 22 about which a tape 23 is wrapped in opposite directions. The tape 23 is guided by guide pins 24 across a media access opening 26 at the front of the cartridge 20. The media access opening 26 is selectively coverable by a door 27 which is pivotally mounted about a pin 28 at the corner of the cartridge 20. The pin 28 is spring loaded to bias the door 27 closed.

The tape 23 is moved within the cartridge by an elastic belt 30. The belt 30 wraps partway around and frictionally engages the tape packs formed by the tape 23 around the hubs 22. It also is guided by corner rollers 32 and a drive roller 33. Drive roller 33 has a drive puck 34 fixed atop thereof. As taught by Von Behren, driving of the puck 34 will move the elastic belt 30, which in turn moves the tape 23.

The cartridge 20 is shown positioned in a tape drive 40. Left rail 42 and right rail 43 of the drive 40 engage grooves 36, 37 in the sides of the cartridge 20 to generally position the cartridge 20 in the drive 40. When fully inserted, the base plate 38 of the cartridge 20 (best seen in FIG. 2) will abut against stops 44 (shown in FIG. 1). The base plate 38 and the stops 44 are carefully formed to ensure that this positions the front end of the base plate 38 in the reference plane for the drive 40, thereby precisely positioning the cartridge 20 in the lateral direction indicated by arrow A. When so positioned, a read/write head 45 of the drive 40 will engage the tape 23 through the media access opening 26, and a drive motor capstan 46 will engage the drive puck 34 to drive the belt 30.

Precise positioning of the tape cartridge relative to the head 45 and capstan 46 is essential for the drive 40 to be able to read from and write to the tape 23 accurately. The stops 44 position the cartridge 20 laterally, that is, how far the tape cartridge will slide into the drive and how it is positioned angularly within the plane of the drawing in FIG. 1. However, they do not control the angle of the tape cartridge relative to the head 45 in the direction vertical to the plane of the drawing in FIG. 1. The industry standards therefore have defined three reference points 50, 51, 52 on the upper surface of the base plate 38 of the cartridge 20. As discussed in more detail below, locators on the lower surface of guide rails 42, 43 are carefully defined at these three locations to ensure that if pressing of the base plate 38 up against the guide rails 42, 43 will position the reference points at the correct angle relative to the drive head 45. Since the base plate 38 is flat and three reference points define a plane, positioning these three reference points properly ensures proper alignment of the cartridge 20.

As best seen in FIG. 2, the cartridge 20 is provided with a notch 54 immediately behind the reference point 51. The lower surface of right rail 43 then has the very precise locators at positions 55, 56 corresponding to reference points 51, 52 on the base plate. A drive then usually has some mechanism, shown here as rollers 57, 58 to force the cartridge base plate reference points 51, 52 up against the rail locators 55, 56. A similar mechanism is provided with reference point 50 and rail 42, though it is not shown in the drawings. Roller 57 and the roller on the other side of the cartridge 20 also press the cartridge 20 towards the stops 44. The net result is that the cartridge is firmly pressed against both the stops and the locator, thereby ensuring completely accurate positioning of the cartridge. A pressure pin sometimes is substituted for roller 58, since it only needs to press the cartridge up, not forward.

It will be noted that upon insertion of the cartridge 20 into the drive 40 in the direction of arrow A, the end of right rail 43 will engage the end 29 of the door 27 on the opposite side of the pivot pin 28 from the main body of the door to pivot the door open about pivot pin 28, so that the door is opened to the position shown in FIG. 1 when the cartridge 20 is fully inserted into the drive 40.

FIG. 3 depicts the front of a typical drive 40, without a tape inserted. The front of a typical drive 40 is usually protected by a face plate 48 with an opening or bezel 49 into which the tape cartridge 20 can fit. A door usually is provided over the bezel opening, but has been omitted in the drawing to show the approximate positions of the left and right rails 42, 43.

It can be noted from FIGS. 1 and 3 in particular that there is a good deal of space on either side of the cartridge 20 in the drive 40. This space might originally have been filled with electronics, such as control systems for the drive. However, with the miniaturization of electronics, this space is now essentially empty, except for left and right rails 42, 43, which project well into the cartridge holding area of the drive 40.

SUMMARY OF THE INVENTION

According to the present invention, a drive is provided which can handle media cartridges having at least two physically different sizes, and a cartridge is provided which can be used with such a drive. Preferably, one of the different size cartridges is an existing, widely used cartridge size.

In a first embodiment, a drive has substantially redesigned rails or an alternative support structure other than rails. One portion of the support structure properly supports a traditional cartridge, while another portion of the support structure supports a new cartridge according to the present invention. The relative spacing of the media access opening and drive mechanism in the new cartridge is the same as in the traditional cartridge. The support structure positions the traditional cartridge and the new cartridge such that their respective media access holes and drive mechanism are in the same position when the cartridge is inserted in the drive. Thus, the drive can read from and write to either size tape cartridge.

In an alternative embodiment, the drive includes a fixed rail on one side of the drive, and a spring loaded rail on the other side of the drive. The spring loaded rail will flex out to hold a traditional cartridge in position against the fixed rail, while it will flex back to allow a cartridge according to the present invention to be inserted into the opening. Again, the head and drive mechanism of the traditional cartridge and the cartridge according to the present invention have the same relative spacings, so that this places them in the same locations relative to the head and drive motor when they are completely inserted into the drive.

In each of the above cases, the new tape cartridge is wider than a traditional cartridge, extending into the prior dead space. Depending on the design of the support structure, the modifications to the drive can be very minor. They may just entail a modification to the rails and inclusion of a modified opening structure to open the cartridge door. Most simply, with a minicartridge they can include a right rail shaped much like a traditional right rail (though narrower), and a top or bottom rail positioned the same distance from the right rail as the left edge of a traditional minicartridge. Alternatively, two top or bottom rails could be used to center the cartridges in the drive. In any case, the wider cartridge will hold more tape, significantly increasing the capacity of the cartridge while allowing the drive to fit into the traditional form factor drive bay.

The new cartridge usually will be provided with notches or shoulders to make use of the modified support structure. For example, if a right rail and top rail as just described are used, the right side of the new tape cartridge will have a support groove much like a traditional minicartridge, and then a notch or shoulder would be provided toward the left side of the new cartridge. One edge of this notch or shoulder would be positioned the same distance from the right side of the cartridge as the distance between the left and right sides of a traditional minicartridge, so that the same top rail can support the new cartridge. If two top or bottom rails are used, the new cartridge can have two corresponding notches or shoulders. It should also be noted that these notches or shoulders also can serve as cartridge differentiating features to prevent cartridges intended for a certain type of drive from being inserted into a different type of drive.

The drive and cartridge modifications above widen the cartridge. According to another aspect of the invention, the drive support structure can handle alternative height cartridges as well. This will allow it to accept different size cartridges, for example, tape cartridges with 6.23 mm (0.25 in) might be thinner than cartridges with 8 mm wide tape. The necessary support can be provide a spring biased cartridge support structure which can flex in the vertical direction. With the smaller 6.23 mm tape cartridge, the rail is biased down to hold the tape cartridge in position. With the thicker tape cartridge, the support structure bends upward, still providing proper support for the 8 mm tape cartridge.

In any of the above situations, preferably the reference points on the new cartridge according to the present invention are positioned in exactly the same locations relative to the media access opening and the drive mechanism as in the traditional cartridge. Doing this will insure that both the old cartridge and the new cartridge are positioned in the same locations relative to the head and drive motor capstan.

The advantage to the present invention is that since it will handle two or more size cartridges, multiple drives are not needed to handle multiple cartridges. A user who has been using traditional size cartridges therefore can upgrade to the new, larger cartridges according to the present invention, but still be able to read and write data on the older cartridges. This is particularly advantageous in situations where large numbers of the older cartridges have been used for archive purposes.

DETAILED DESCRIPTION OF THE PREFERRED EMBODIMENTS

Figure 1:
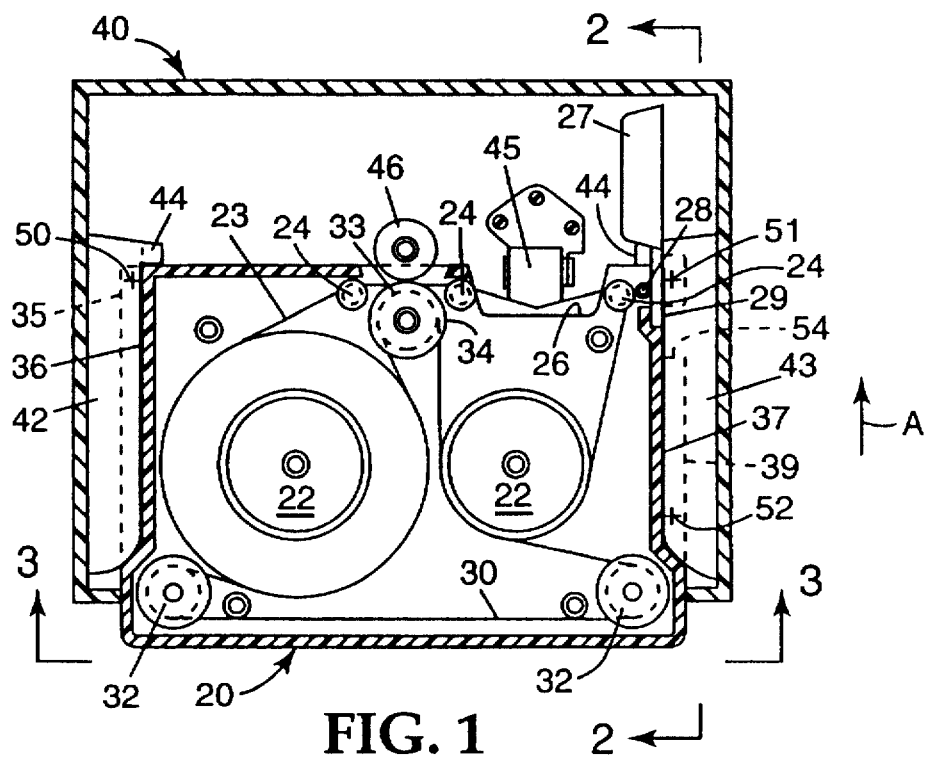
FIG. 1 is a cross-sectional plan view of a prior art tape minicartridge in a schematically represented prior art drive.

Details of the invention will be described primarily with reference to computer data tape cartridges and drives, although the invention can be used with other types of cartridges and drives. Referring to FIGS. 4–7, terms such as "width" or "wider" as used herein refer to the dimensions of the cartridge in the direction of arrows W, while "length" or "longer" refer to the dimensions in the direction of the arrows L. "Height" or "thickness" refer to the dimensions in the direction of arrows "H". The "front" of the cartridge is the side of the cartridge where the media access opening and drive puck are located (which also is the side of the cartridge normally inserted first into a drive), while the "front" of the drive is the portion of the drive into which the cartridge would normally be inserted (and which normally is exposed on the outside of a computer). In both cases, the "back" is the side opposite from the front. The "base" or "bottom" of the cartridge is the rigid plate used to define reference points (as discussed below), while it is the side of the drive toward which the base of the cartridge would be oriented when inserted in the drive. In both cases, "lower" means on the side toward the bottom, the "top" is the opposite side from the bottom, and "upper" means on the side toward the top. The "left" and "right" sides of the cartridge are as defined looking from the back to the front of the cartridge with the top side up. The "left" and "right" sides of the drive are as defined looking from the front to the back of the drive with the top side up. (This apparent inconsistency is the common usage, and essentially designates the left and right sides as a person inserting a cartridge into a drive normally would see them.) Arrows have been omitted from drawings other than FIGS. 4–7, but the directions apply to them as well. It will be understood that use of these terms is for clarity only, and the drive and cartridge may actually be oriented in any direction relative to the world in general.

FIGS. 4–7 depict first embodiments of a cartridge 60 and drive 80 according to the present invention. The cartridge 60 is somewhat wider and longer than the standard minicartridge 20, the outline of the sides of which is shown in phantom lines in FIG. 4. The hubs 62 of the cartridge 60 are repositioned to allow optimum use of the space within the larger cartridge 60. This repositioning allows for a larger tape pack, so that the cartridge 60 can hold more tape. Since the volume of tape contained in the tape pack increases with the square of the radius of the tape pack, even a relatively small increase in the tape pack radius amounts to a substantial increase in the tape volume which can be held in the cartridge 60 compared to the cartridge 20.

The media access opening 63 and drive puck 64 are positioned in the same relative locations to one another as they would be in the traditional minicartridge 20. Similarly, the reference points 66, 67, 68 are located in the same positions relative to the media access opening 63 and drive puck 64 as they would be in a traditional minicartridge 20.

To allow access to the reference points 66, 67, 68, the right groove 70 can take substantially the same shape as the right groove 37 in the traditional minicartridge 20. In the embodiment shown, access is provided to the reference point 66 by running the corner sidewall 71 at an angle, through otherwise unused space in the cartridge 60. The left groove 36 may be eliminated, since the left rail 42 will be replaced by a top guide rail, discussed below. Positioning instead will be done using a support notch 73 in the top of the cartridge (best seen in FIGS. 5 and 6) engageable with the top guide rail discussed below. (Note that elimination of the left groove 36 further increases the interior space inside the cartridge available for the tape pack.)

The right rail 82 of the drive 80 does not extend as far into the drive as the traditional right rail 43. Instead, it is much narrower, so that the additional space is available for the larger cartridge 60. However, the shape of the portion of the rail 82 which actually interacts with the cartridge is substantially the same as the shape of the traditional rail 43.

Figure 7:
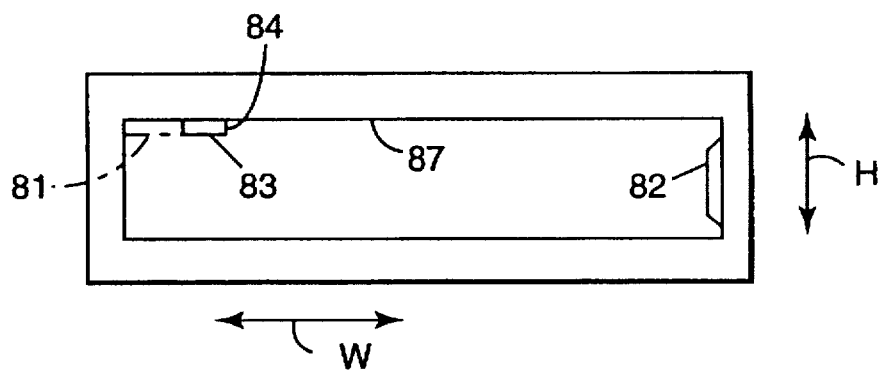
FIG. 7 is an illustration of the front face of the drive of FIG. 4, as seen along lines 7—7 in FIG. 4 and with no tape in the drive.
Figure 6:
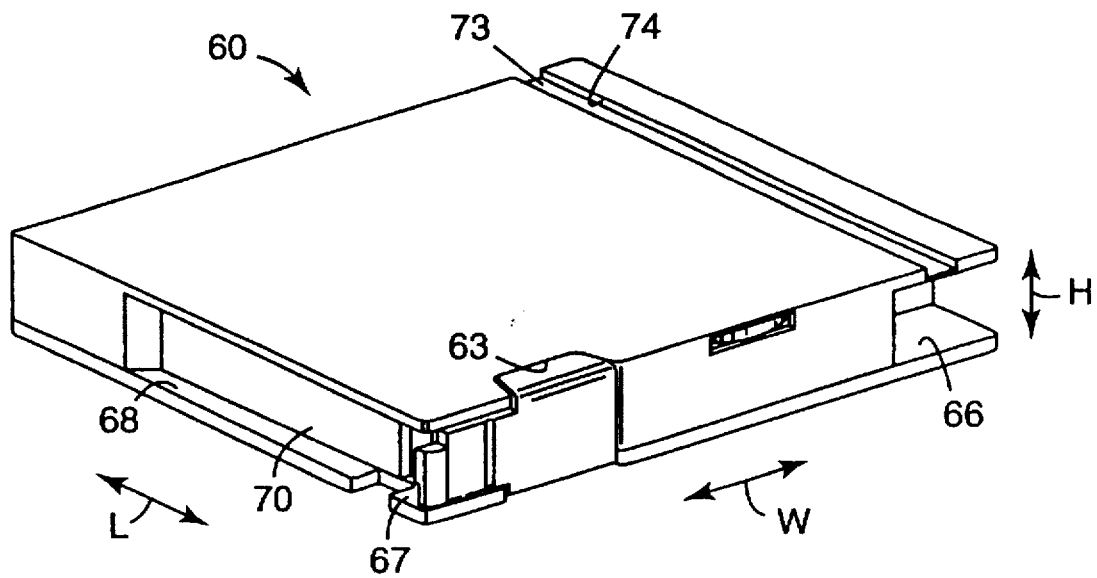
FIG. 6 is a perspective view of the cartridge of FIG. 4.

In contrast, the left rail can be eliminated in the drive 80, and replaced by a top guide rail 83 (see FIG. 7). The side 84 of top rail 83 closest to the center of the drive 80 is positioned to engage the top of the left side 35 of a traditional minicartridge 20 (see FIG. 1). The side 74 of the notch 73 closest to the center of the new cartridge 60 is positioned so that it also will engage the side 84 of top rail 83, that is, the relative positions of the side 74 of the notch 73 and the right groove 70 of the cartridge 60 are substantially the same as the relative positions of the left side 35 and the right groove 37 of the traditional minicartridge 20. Thus, the top rail 83 provides sideways positioning support to either the minicartridge 20 or the cartridge 60 by engaging the left side 35 or the notch side 74, respectively.

The drive 80 also includes a reference point rail stub 85. This rail stub 85 engages the reference point 66 on the new cartridge or the reference point 50 on the old cartridge 20. It also serves as a stop at the front of the cartridge, so that together with the stop 86 at the end of right rail 83, it serves to position the front of the cartridge in the proper plane for the head 88. The right rail 82 has locators similar to those on the traditional right rail 43, and the drive includes rollers or pressure pins like rollers 57, 58. With this structure, the rollers hold either the traditional minicartridge 20 or the new cartridge 60 against the reference point rail stub 85, right rail 82 and stop 86 to position the cartridge in substantially the same manner that rollers 57, 58 pushed the traditional minicartridge 20 against left and right rails 42, 43 and stops 44.

Reference point rail stub 85 preferably is positioned to the front of the cartridge as shown in the drawing, but it can extend in from the side, as shown in phantom at 81. The advantage to coming in from the front is that a smaller stub can be used and if for any reason the cartridge designer chose to provide merely a notch around the reference point 66, rather than the angled wall 71 as shown, the rail stub still could reach the reference point 66. Similarly, while a notch 73 has been shown, the notch could be a shoulder, with the lowered portion of the cartridge 60 extending all the way out to the left side of the cartridge (as shown in some of the other embodiments).

Figure 4:
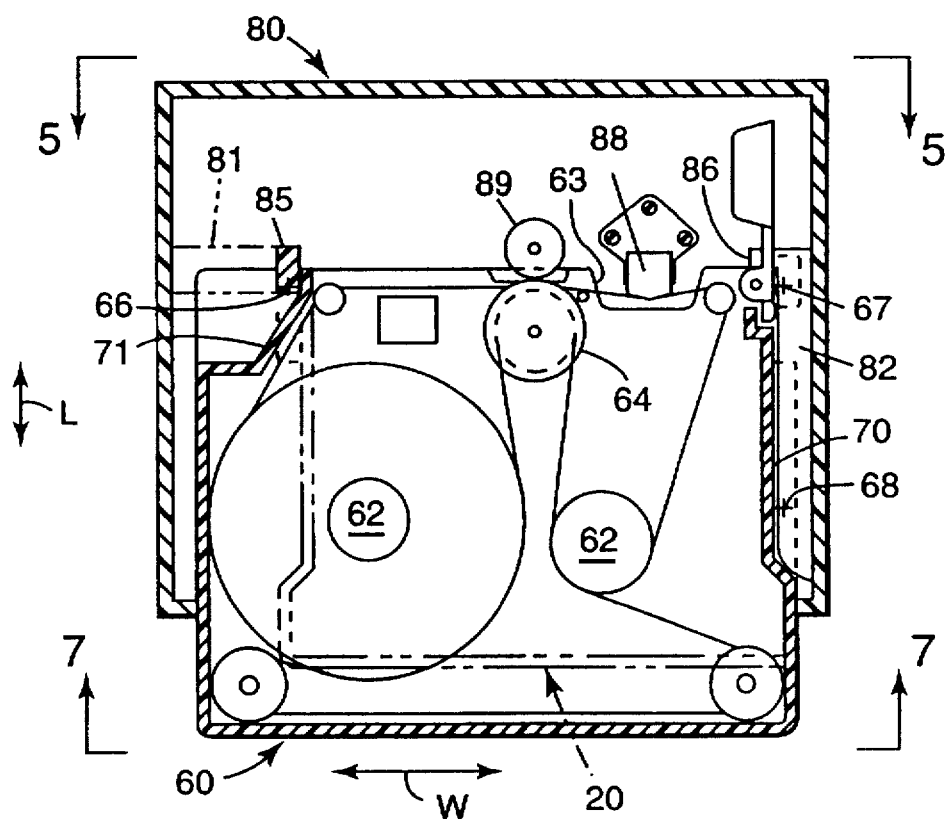
FIG. 4 is a cross-sectional plan view of a first embodiment of a cartridge according to the present invention in a schematically represented first embodiment of a drive according to the present invention.
Figure 5:
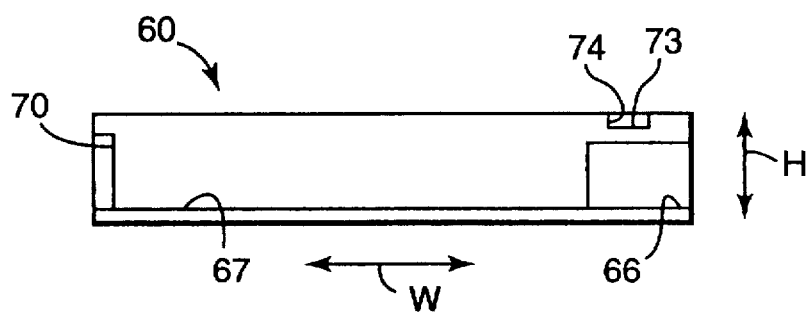
FIG. 5 is a view of the front face of the cartridge of FIG. 4, as seen along lines 5—5 in FIG. 4 and with the door, media access opening and drive puck omitted for clarity.

The bezel 87 of the drive 80 must of course be larger than the bezel 49 of the traditional drive 40 to accommodate the larger cartridge 60. In addition, the positions of the read-write head 88 and drive motor capstan 89 are shifted slightly to the right as seen in FIG. 4 from their position closer to the center of a standard drive as shown in FIG. 1. The remaining electronics of the drive 80 are substantially the same as those of the traditional drive. Such electronics are well known to one of skill in the art, and therefore have been omitted for clarity.

Figure 11:
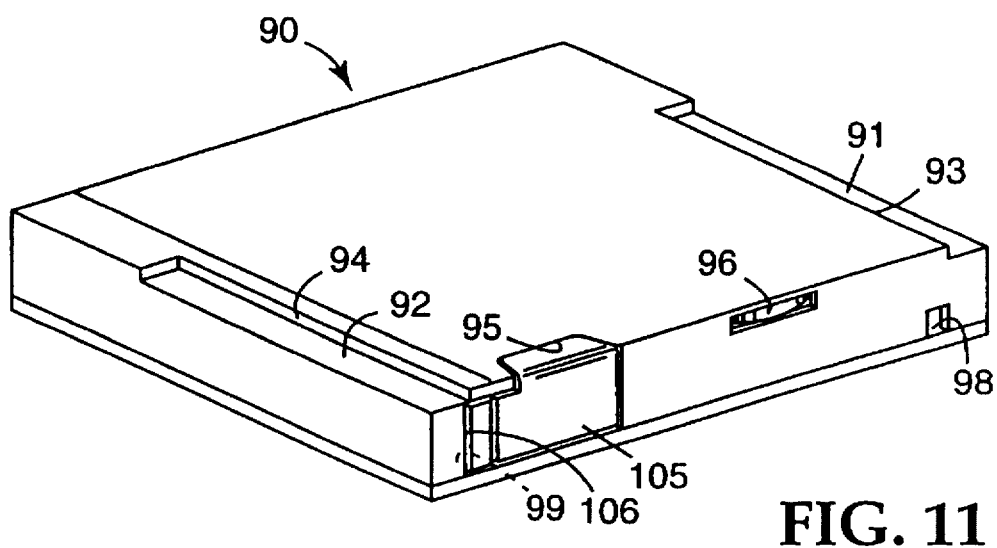
FIG. 11 is a perspective view of the cartridge of FIG. 8.

The second embodiment shown in FIGS. 8–11 avoids the difficulties which may arise in some situations in making the modifications necessary to shift the head and drive motor capstan to the right (for example, having to redesign a circuit board). In the first embodiment, the front right portion of the cartridge 60 could be said to "match" the exterior shape of a traditional minicartridge 20, that is, the media access opening 63, drive puck 64, reference points 66, 67, 68, notch side 74 and the like all were positioned to the front right portion of the cartridge 60. In contrast, the portion of the cartridge 90 of the second embodiment which "matches" the outline of the traditional minicartridge 20 is centered, as best seen in FIG. 11. In particular, the interior sides 93, 94 of the support shoulders 92, 93 are positioned relative to the media access opening 95 and drive puck 96 of cartridge 90 in exactly the same manner as the tops of the left and right sides 35, 39 of the traditional minicartridge 20 (see FIG. 1) are positioned relative to its media access opening 26 and drive puck 34.

Figure 8:
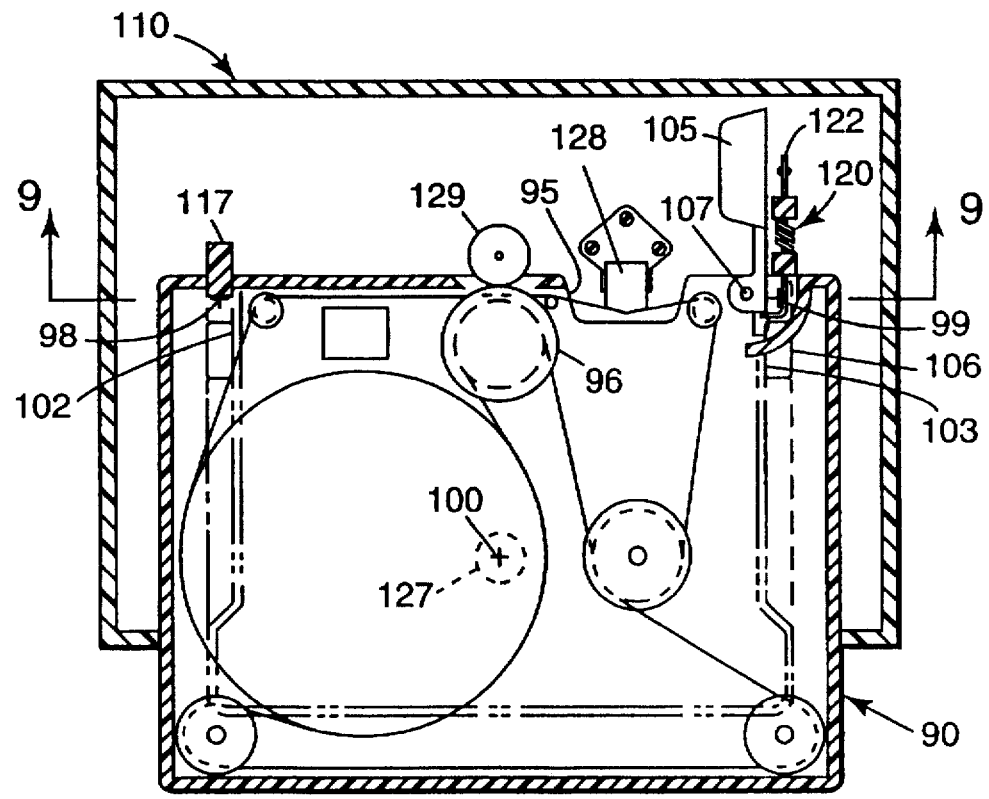
FIG. 8 is a cross-sectional plan view of a second embodiment of a cartridge according to the present invention in a schematically represented second embodiment of a drive according to the present invention.

As best seen in FIG. 8, one consequence of this is that while the reference points 98, 99 can still be accessed from notches in the front of the cartridge 90, the reference point corresponding to traditional reference point 56 is now completely inaccessible. Since a third reference point still is needed, a new reference point 100 is defined near the center of the cartridge. (The base plate of a cartridge is very stiff, so that the reference point actually could be defined virtually anywhere on the base plate. It is just the convention to use the location 56.) Engagement of the drive with this reference point will be described below. In addition, latching notches 102, 103 are provided in the base plate.

The door 105 for the media access opening 95 also is positioned differently from in the cartridge 60. In the traditional minicartridge 20 and in the first embodiment of the cartridge 60 according to the present invention, the door is positioned at the corner of the data cartridge. If it were so positioned in the present cartridge 90, it would not correspond in location to the door 27 of the traditional minicartridge 20. The door 105 therefore is positioned somewhat in from the corner, as best seen in FIG. 8. A notch 106 to the right of the pivot pin 107 allows access to the reference point 99 and pivoting of the door 105, as will be described below.

Figure 9:
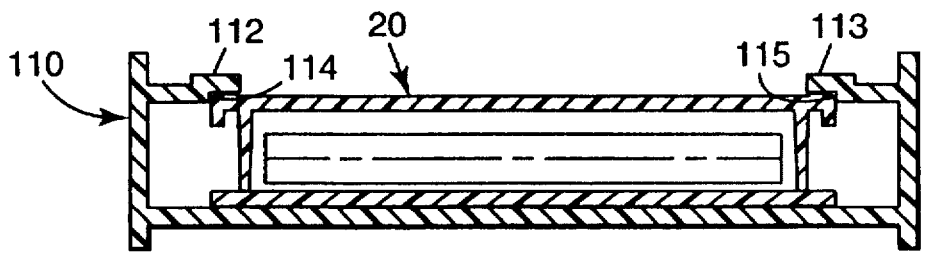
FIG. 9 is a cross sectional view along lines 9—9 in FIG. 8 of the drive of FIG. 8 holding a traditional minicartridge.
Figure 10:
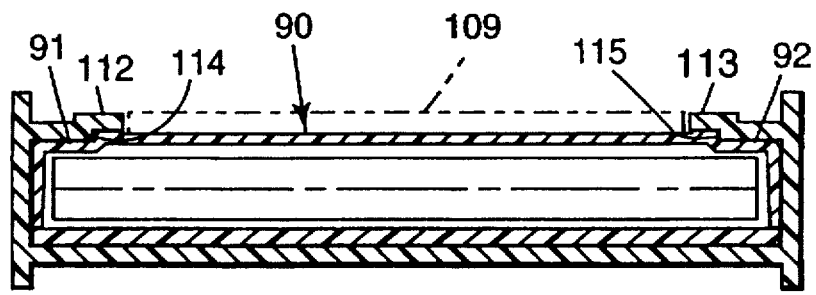
FIG. 10 is a cross sectional view along lines 9—9 in FIG. 8 of the drive of FIG. 8 holding the cartridge of FIG. 8.

In drive 110, the left and right rails 42, 43 have been eliminated completely. They have been replaced by specially shaped top rails 112, 113, as shown in FIGS. 9 and 10. As best seen in FIG. 9, each top rail has a shoulder 114, 115 formed in it which properly positions a traditional minicartridge 20 by engaging the top of the left and right sides 35, 39 of the minicartridge 20.

As best seen in FIG. 10, the support shoulders 91, 92 in the cartridge 90 according to the present invention are deep enough for the cartridge 90 to fit under lower portion of the top rails 112, 113. However, since the inner sides 93, 94 of the support shoulders 91, 92 are positioned in the same locations as the outer sides 35, 39 of a traditional minicartridge 20, shoulders 114, 115 engage the support shoulder sides 93, 94 to properly position the cartridge 90 according to the present invention.

Since there is no right rail 43 in the drive 110, some other mechanism must be provided to open the media access door 105. One such door opening mechanism 120 is shown generally in FIG. 8, and in detail in FIG. 19. In this mechanism, a rod 122 is slidably mounted in a mounting block 123. A collar 124 is fixed to the rod and a spring 126 is compressed between the mounting block 123 and collar 124. A stop 125 on the rod 122 prevents the rod 122 from slipping through the mounting block 123. The spring 126 is stiffer than the spring used to bias the media access door 105 closed. As will be apparent, upon insertion of either a new cartridge 90 or a traditional minicartridge 20 into the drive 110, the rod 122 will engage the end of the media access door 105, causing the door to pivot open. As the cartridge continues to move into the drive 110, the spring 126 will be compressed, allowing the cartridge to completely enter the drive. If desired, the door-opening mechanism 120 can simply be incorporated into the spring-eject mechanism found in many drives, to avoid duplication of the spring 126.

In addition to the top rails 112, 113, the drive 110 includes two reference point rail stubs similar to reference point rail stub 85 in the first embodiment. Only one is shown in the drawings (at 117). The other would be positioned underneath door opening mechanism 120, and has been omitted for clarity of illustration. These rail stubs engage the reference points 98, 99 and the front edge of the cartridge base plate in much the same manner that reference point rail stub 85 engaged reference point 66 and the front edge of the cartridge base plate in the first embodiment.

Figure 2:
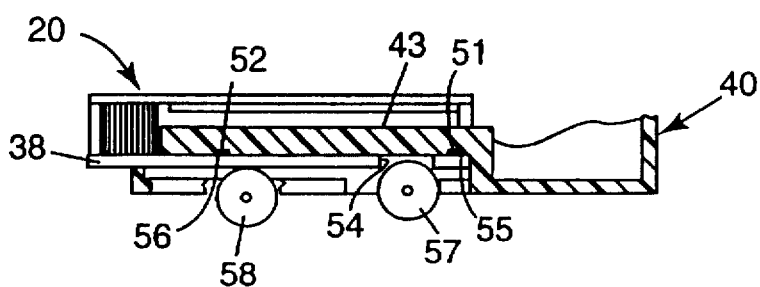
FIG. 2 is a side view in partial section of the minicartridge and drive of FIG. 1 along lines 2—2 in FIG. 1.
Figure 3:
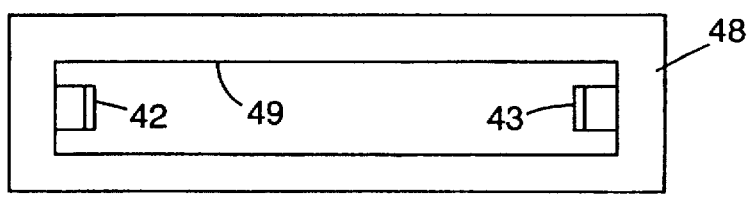
FIG. 3 is a front view of the drive of FIG. 1 (with no tape in the drive) along line 3—3 in FIG. 1.

The drive 110 also includes a locator 127 positioned beneath the reference point 100. To properly position either a traditional minicartridge 20 or the cartridge 90 in the drive, the cartridge is inserted into the drive so that the reference points 98, 99 engage the reference rail stubs. Rollers or suitable pressure pins such as those shown in FIG. 2 are used to engage notches 102, 103 to hold the reference points 98, 99 in contact with the reference point rail stubs 117, 118. An additional roller, pressure pin or the like presses down on the top of the cartridge to engage reference point 100 on the bottom of the base plate of the cartridge with support 127. This defines three reference locations, properly positioning the cartridge.

As will be apparent from the foregoing, the head 128 and drive motor capstan 129 of the drive 110 are positioned not just in the same relative locations, but in exactly the same locations as in a traditional drive such as that shown in FIG. 1. A large advantage to this structure is that all of the electronics connected to the head 128 and capstan 129 can be left substantially as is. Only the mechanical components of the cartridge support, namely the rails, reference point locators and door-opening mechanism need to be changed. This may be a much simpler proposition than changing the electronics.

This embodiment has the further advantage that if desired at least the central portion of the cartridge 90 could be substantially taller than in a traditional cartridge 20, as shown in FIG. 10 in phantom at 109. This can have significant advantages for the width of tape which can fit in the cartridge. With belt-driven cartridges, the drive puck normally fits inside the cartridge above the tape. A wider tape, for example, 8 mm instead of 6.23 mm, would fit in the portion of the cartridge 90 even under the support notches 91, 92. However, there might not then be sufficient space for the drive puck 96 above the tape, or the cartridge top might have to be very thin to accommodate the wider tape (reducing its strength). With the greater height shown in phantom at 109, there would be ample space for the drive puck. Thus, provided the read-write head and drive capstan were made tall enough to handle the different possible positions of the drive puck and width of the tape, the drive 110 could handle a traditional minicartridge with 6.23 mm tape, a larger cartridge 90 according to the present invention with 6.23 mm tape or a still larger cartridge 109 using 8 mm or wider tape. Still further cartridge size could be handled by providing additional shoulders in the top rails 112, 113.

Figure 12:
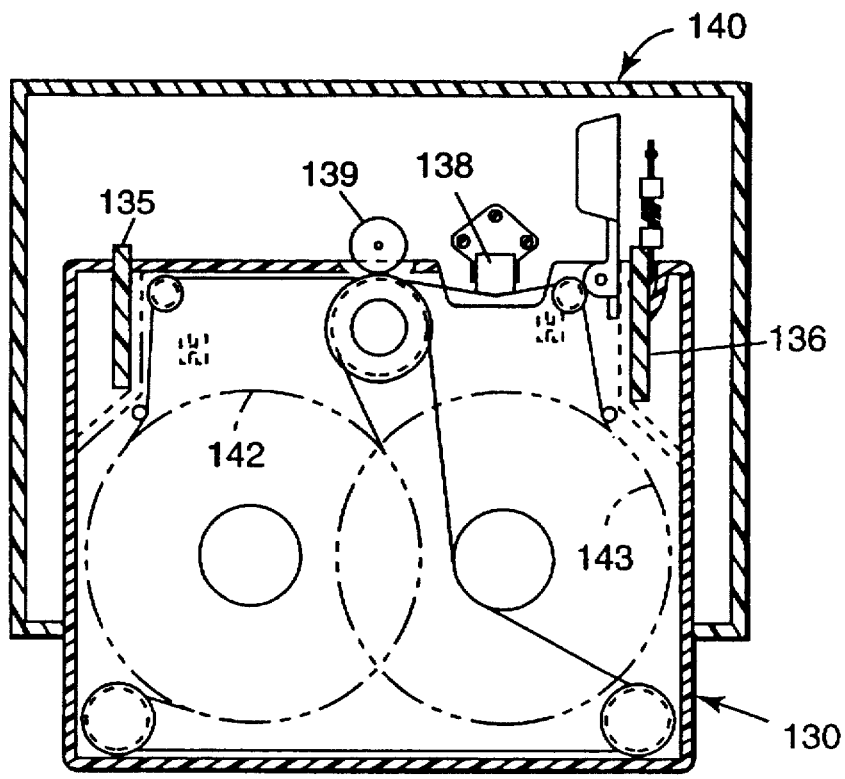
FIG. 12 is a cross-sectional plan view of a third embodiment of a cartridge according to the present invention in a schematically represented third embodiment of a drive according to the present invention.
Figure 13:
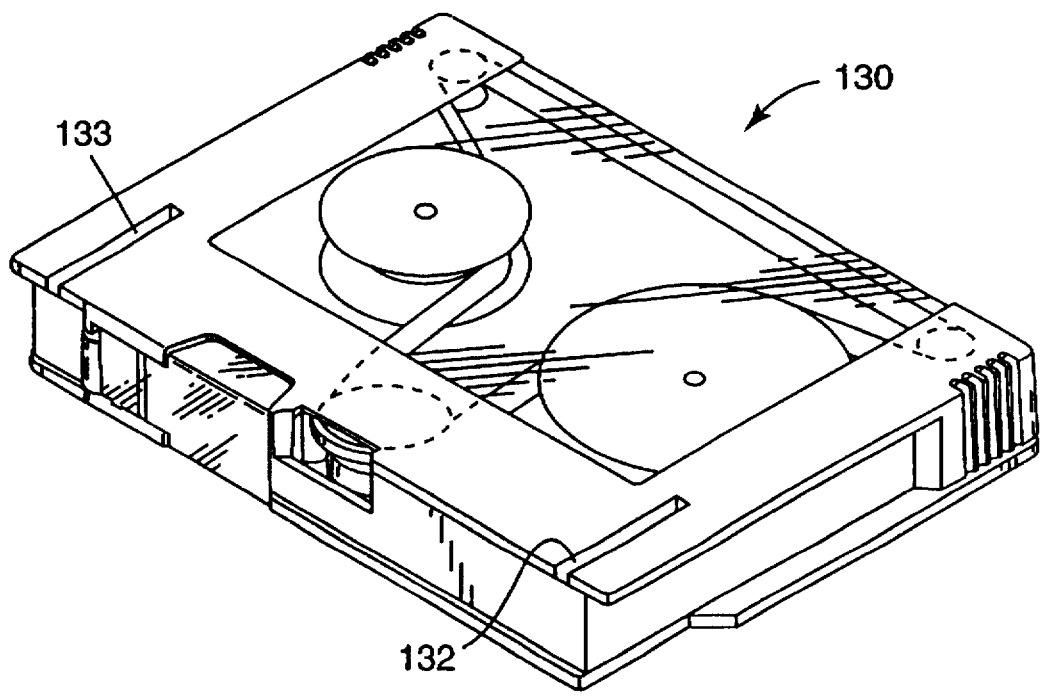
FIG. 13 is a perspective view of the cartridge of FIG. 12.

FIG. 12 illustrates a third embodiment of a cartridge and drive according to the present invention. In this embodiment, support shoulders 132, 133 are provided in the top of cartridge 130. These shoulders are analogous to the support shoulders 91, 92 in the second embodiment of FIGS. 8–11, that is, they are symmetrically positioned on either side of the cartridge so that the cartridge is centered rather than offset to the right. The notches 132, 133 also extend only part-way back along the cartridge 130, rather than all the way to the base of the cartridge. This avoids limiting the height clearance inside the cartridge in any portion of the cartridge where tape might be, so that wider width tape can fit in the cartridge without risk of interference with the notches 132, 133.

Dual support rails 135, 136 corresponding to top support rail 83 in the first embodiment then are provided in the drive 140 to engage notches 132, 133. As in the second embodiment, the relative spacing of the inner sides of top support rails 135, 136 is such as to hold the top of the left and right sides of a standard minicartridge. As will be apparent, this design again has the advantage of allowing the head 138 and drive motor capstan 139 to be left in their traditional positions.

A modification of the reference point locators similar to that of the second embodiment may be required in the drive 140 according to this embodiment. A door opening mechanism such as that shown in FIG. 19 also may be needed.

In FIG. 12, the lines shown for the tape packs 142, 143 represent their maximum outer circumference, which overlap. The physical tape packs themselves do not in fact overlap, since when the tape is wound on one pack it is not on the other, and vice-versa. However, overlapping the tape pack maximum diameters in this fashion can still further increase the capacity of the cartridge.

The drives shown in FIGS. 4–13 use various fixed rails or supports to position multiple size cartridges. In the embodiments shown in FIGS. 14–16, at least one of the guide rails is movable.

Figure 14:
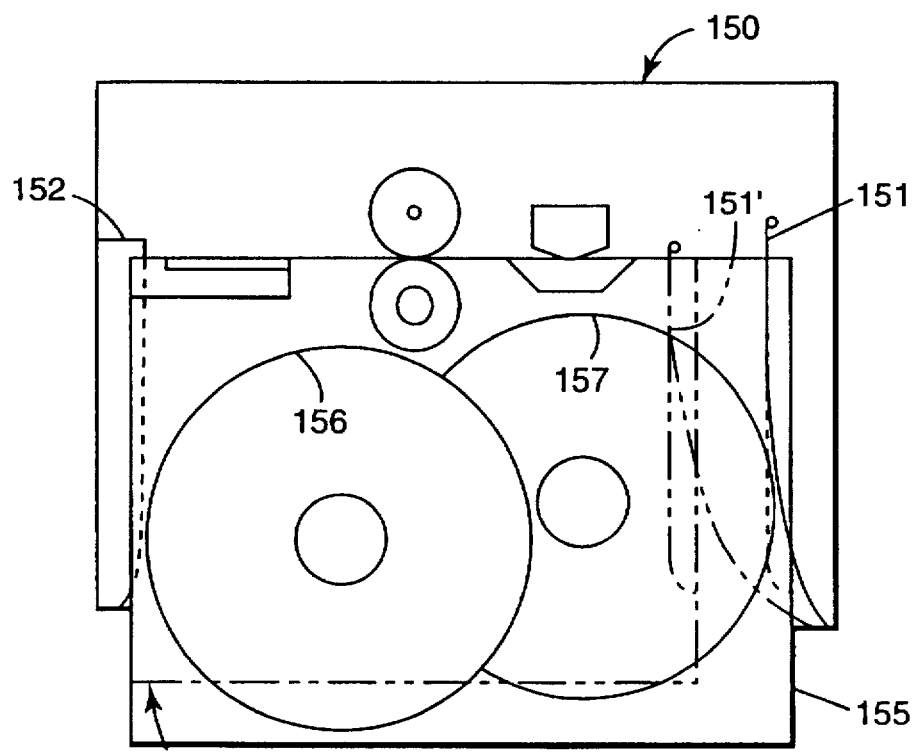
FIG. 14 is a cross-sectional plan view of a fourth embodiment of a cartridge according to the present invention in a schematically represented fourth embodiment of a drive according to the present invention.
Figure 19:
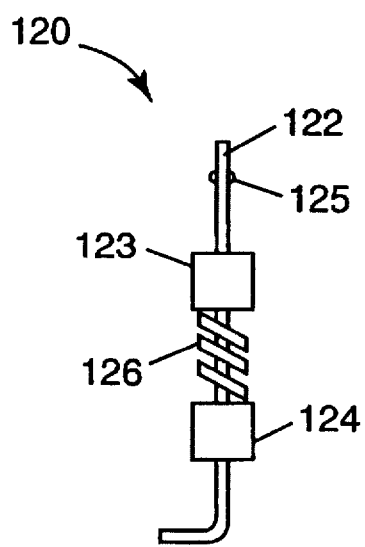
FIG. 19 is a detail view of the door opening mechanism of FIGS. 8 and 12.

In the embodiment shown in FIG. 14, the right guide rail 151 of the drive 150 is either formed by a spring or biased toward the center of the drive by a spring. In use, the sprung right rail 151 then will move toward position 151' to hold a traditional minicartridge 20, while moving to position 151 to hold a larger cartridge 155 according to the present invention. Note that in this structure, the larger cartridge 155 is provided with both left and right guide grooves. Depending upon the shape and positioning of the right rail 151, it may be necessary to provide a door-opening mechanism such as shown in FIG. 19.

Figure 15:
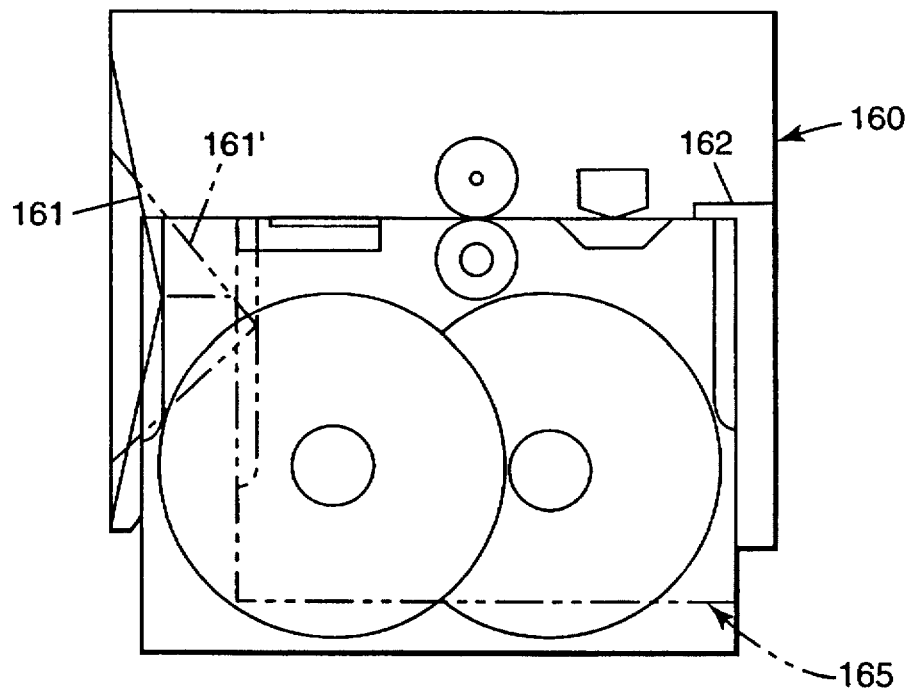
FIG. 15 is a cross-sectional plan view of a fifth embodiment of a cartridge according to the present invention in a schematically represented fifth embodiment of a drive according to the present invention.

In the embodiment of FIG. 15, the left guide rail 161 of drive 160 is either formed by a spring or biased toward the center of the drive by a spring. The right guide rail 162 can be formed in the traditional shape, though narrower than the traditional guide rail to allow use of the space by the larger cartridge 165. In operation, the sprung left rail 161 will move toward position 161' to hold a traditional minicartridge 20, while moving to position 161 to hold a larger cartridge 165 according to the present invention. Again, both a left and a right guide groove are provided in the larger cartridge. In this embodiment, the right rail 162 can still serve its traditional function as a door-opening mechanism.

The advantage of the designs in FIGS. 14 and 15 over those in the prior embodiments is that the entire cartridge can be at the maximum thickness (height) allowed in the drive. Notches or indentations to match top rails or the like are not necessary. This may allow a higher tape capacity, since wider tape may be used.

In FIG. 14, note that the tape packs 156, 157 not only overlap, they are their hubs are offset from a line parallel to the front face of the cartridge. This can allow a still further increase in the capacity of the cartridge.

Figure 16:
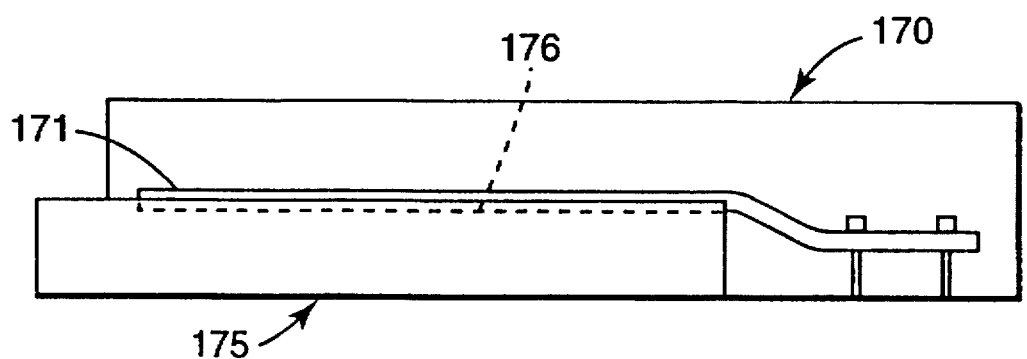
FIG. 16 is a side view in partial section of a cartridge in a schematically represented sixth embodiment of a drive according to the present invention.

In addition to being sprung sideways, the support rails could be sprung vertically. FIG. 16 illustrates a cross section taken through a drive 170 with a cartridge 175 having a notch 176 in its top surface such as those described above. In this embodiment the top support rail 171 of the drive 170 is flexible upwards. This allows for different thickness tape cartridges to be used in the drive. Such a vertically flexible guide rail could be used with any of the embodiments discussed above using a top rail.

Figure 17:
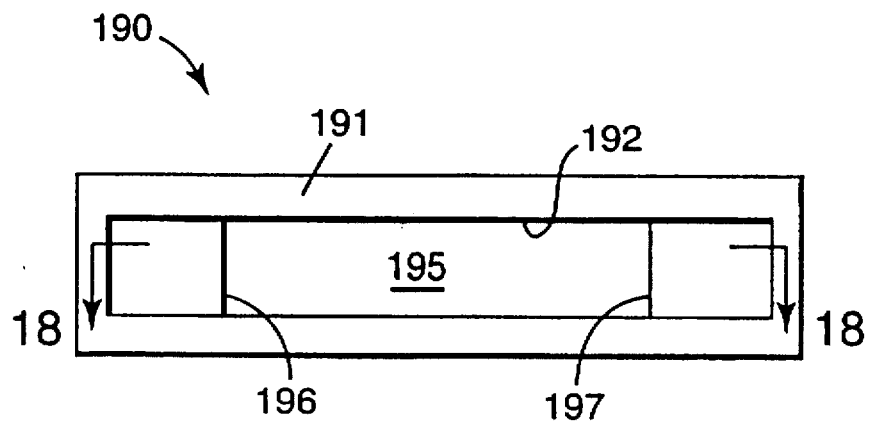
FIG. 17 is a front view of a seventh embodiment of a drive and drive door according to the present invention.
Figure 18:
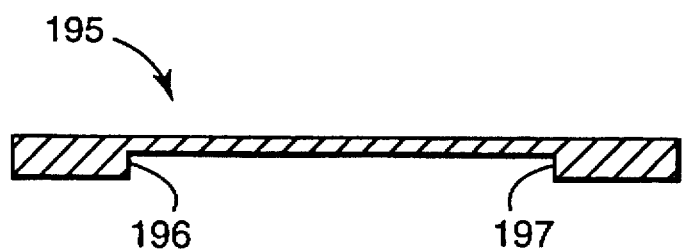
FIG. 18 is a cross-sectional view along line 18—18 in FIG. 17 of the drive door of FIG. 17.

The top rails could also be positioned on drive door rather than inside the drive. The drive door has been omitted from FIGS. 1–16 for clarity. It is included in FIGS. 17 and 18. FIG. 17 shows the front face 191 of a drive 190. The bezel 192 is closable by a door 195. The door 195 is pivotally mounted in the drive 190 in the usual manner, and preferably is spring biased into a closed position.

According to the present invention, the door is provided with shoulders 196, 197 which correspond in position to the edges of the top rails used in the previous embodiments. As will be apparent, upon insertion of a cartridge into the drive 190, the door 195 will pivot up, putting the shoulders 196, 197 in the same positions as the top rails in the prior embodiments, so that they can function to position a cartridge in substantially the same way as the top rails.

While the door has been shown with two shoulders, a drive could use one door mounted shoulder with an internal side rail, use a ridge on the door instead of a shoulder to correspond to a notch in a cartridge instead of a shoulder, or otherwise mix and match the various support structures mentioned above.

As will be apparent from the foregoing, the critical factor in designing the drive and cartridges according to the present invention is that the relative placements of the drive mechanism and the media access opening in the cartridge be held constant in the variety of different size cartridges. Preferably, the relative positions of the reference points also are held constant. Suitable support mechanism then can be defined to insure that the drive mechanism, the media access opening and reference points are always properly positioned relative to the drive motor and the read-write head.

Numerous modifications to the invention will be readily apparent to one of ordinary skill in the art. For example, various alternative rails or support mechanisms other than those described could be used, or the various rails and support mechanisms described herein could be combined differently. At the simplest, the top rails and corresponding notches described above could all be on the bottom of the drive cartridge rather than the top.

Likewise, while the invention has been shown applied to a mini size Von Behren-type elastic belt-driven tape cartridge, it is not limited to just that type of cartridge. It can be used with any data storage media container (including cartridges, disks, cassettes or the like) where the relative positions of the drive/control mechanism for moving the media and the media access opening providing the drive head access to the media can be held constant between different sizes. It also should be noted that the media access opening could be differently sized in different embodiments (for example, with a diskette having a larger diameter), so long as the drive head can reach all of the media access opening on all of the embodiments to be used in the drive.

The current invention therefore is intended to be limited only by the following claims.

We claim:

1. A data storage cartridge having a baseplate with a top surface and a bottom surface and at least one reference point defined on each of the top and bottom surfaces to allow accurate positioning of the cartridge in the drive.

2. The data storage cartridge of claim 1, wherein at least the reference point on the bottom surface is positioned proximate to the center of the data cartridge.

3. The data storage cartridge of claim 1, wherein the baseplate further comprises a front edge at the front of the cartridge and extending between the top and bottom surfaces, and comprising two reference points on the top surface, one reference point on the bottom surface and two reference points on the front edge.

4. A data storage cartridge drive for use with a data cartridge, the cartridge having a baseplate with a top surface and a bottom surface and at least one reference point defined on each of the top and bottom surfaces to allow accurate positioning of the cartridge in the drive, the drive comprising a positioner in the drive for engaging said reference points to accurately position the cartridge in the drive.

5. The data storage cartridge drive of claim 4, wherein the positioner comprises a rail stub mounted in the drive for engaging a reference point defined at the front and on the top of the baseplate.

6. The data storage cartridge drive of claim 4, wherein the positioner comprises a locator mounted in the drive for engaging a reference point defined on the bottom of the baseplate.

7. The data storage cartridge drive of claim 6, wherein the locator is mounted in a position proximate to the center of the baseplate of the cartridge when a cartridge is inserted in the drive.

8. A data storage tape cartridge selectively positionable in a drive, comprising:
   a. a cover having a front, back, top and two sides;
   b. a baseplate having a top and bottom, the baseplate being mounted to the cover to form a housing;
   c. a media access opening formed in the housing;
   d. a drive opening formed in the housing;
   e. hubs rotatably mounted in the housing;
   f. tape media wrapped around the two hubs in the housing to form two tape packs, extending past the media access opening and accessible from the outside of the housing through the media access opening, wherein at least portions of the cover sides normally positioned inside the drive when used therewith and positioned to either side of the tape packs extends to substantially the same width as the baseplate;
   g. a drive puck rotatably mounted in the housing and accessible from the outside of the housing through the drive opening;
   h. at least one belt roller rotatably mounted in the housing on the opposite side of the tape packs from the drive puck; and
   i. an elastic belt wrapped around the drive puck, belt roller and the tape such that the rotation of the drive puck will move the tape.

9. The data storage tape cartridge of claim 8, wherein the hubs are positioned such that the nominal maximum diameters of the tape packs overlap one another, but such that tape which is wound in one pack will never actually interfere with tape wound on the other pack.

* * * * *